United States Patent [19]

Abelitis

[11] 4,349,387

[45] Sep. 14, 1982

[54] METHOD FOR CALCINING FINE-GRAINED MATERIAL, PARTICULARLY FOR THE MANUFACTURE OF CEMENT CLINKER

[75] Inventor: Andris Abelitis, Rösrath, Fed. Rep. of Germany

[73] Assignee: Klöckner-Humboldt-Deutz AG, Fed. Rep. of Germany

[21] Appl. No.: 254,858

[22] Filed: Apr. 16, 1981

[30] Foreign Application Priority Data

Apr. 16, 1980 [DE] Fed. Rep. of Germany ....... 3014599

[51] Int. Cl.$^3$ ............................................... C04B 7/02
[52] U.S. Cl. ..................................... 106/100; 106/103
[58] Field of Search ................................ 106/100, 103

[56] References Cited

U.S. PATENT DOCUMENTS 4,191,586  3/1980  Dambrine ........................... 106/100

Primary Examiner—James Poer
Attorney, Agent, or Firm—Hill, Van Santen, Steadman, Chiara & Simpson

[57] ABSTRACT

A method for burning fine-grained material particularly for the manufacture of cement clinker wherein a stream of the raw cement meal is sequentially treated at progressively increasing temperatures in a preheating stage, a pre-calcining stage, a calcining stage, and a sintering stage. The improvements involve introducing one or more deacidified raw meal fractions into the stream at one of a variety of possible locations so that recarbonation does not occur.

7 Claims, 1 Drawing Figure

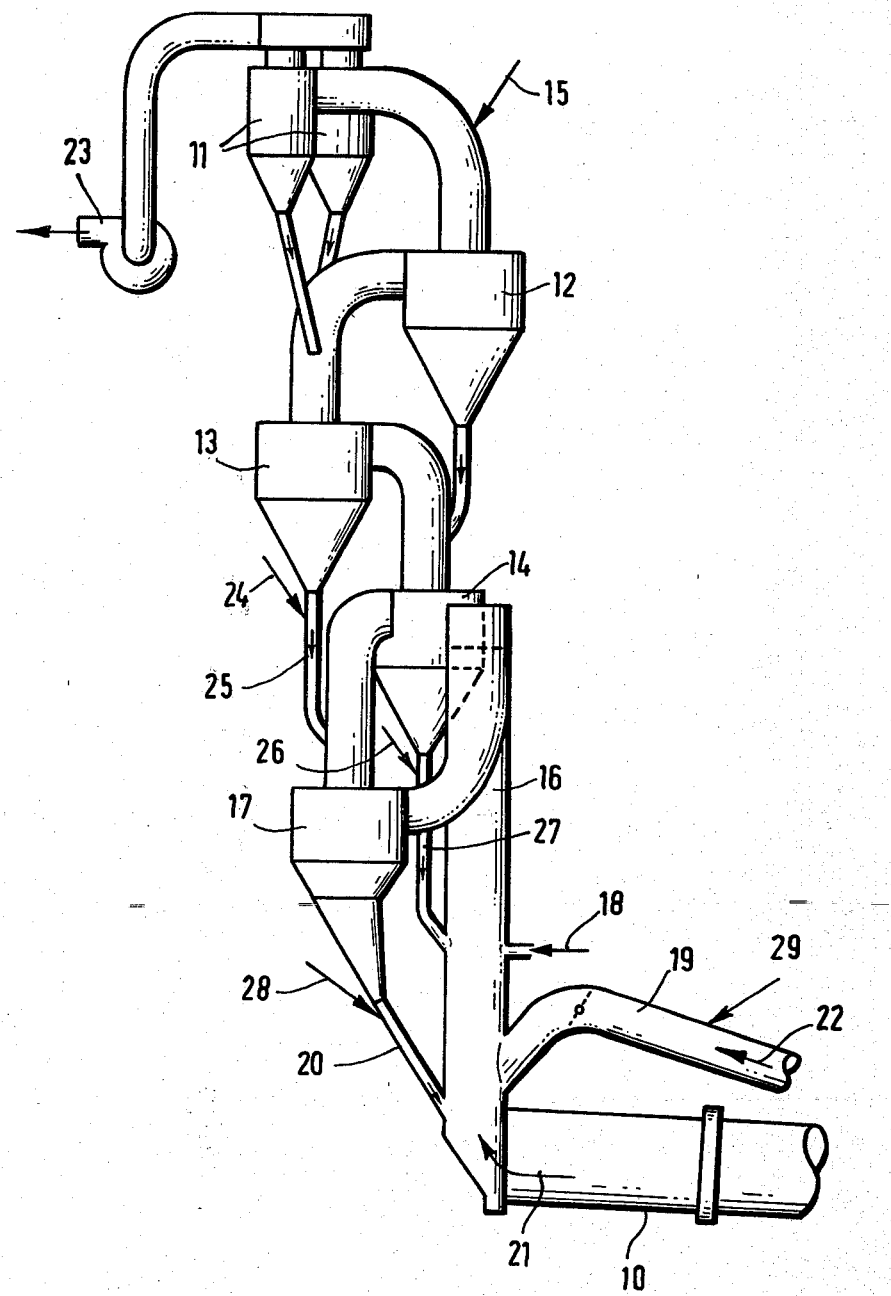

METHOD FOR CALCINING FINE-GRAINED MATERIAL, PARTICULARLY FOR THE MANUFACTURE OF CEMENT CLINKER

The invention relates to a method for calcining fine-grained material, particularly for the manufacture of cement clinker from raw cement meal which usually consists of a limestone component ($CaCO_3$) and of a clay component and which is thermally treated in a calcining system consisting of a preheating stage, a calcining stage and a sintering stage.

In calcining cement clinker from raw cement meal, said raw meal generally consists of a fine-grained mixture of a limestone component and of a clay component. This mixture is preheated and calcined with hot exhaust gases of a sintering stage, for example, of a rotary tubular kiln and/or with the hot exhaust gases of a precalcining stage in a preheating stage and calcining stage, for example, in a cyclone heat exchanger system, i.e., the raw meal is deacidified or decarbonated in that $CO_2$ is driven off from the limestone component, being absorbed into the stream of exhaust gas. In operations which produce calcined lime (CaO) and/or lime hydrate (calcium hydroxide, $Ca(OH)_2$) in addition to cement clinker and/or in which larger amounts of deacidified dusts are produced in the various dedusting devices, there can be a desire to employ such materials for the production of cement clinker. If one were to add such deacidified materials to the raw cement meal which has not yet been deacidified, then said deacidified materials would come into contact with the exhaust gases of the preheating stage which are high in $CO_2$ and a recarbonation of the deacidified materials would unavoidably occur. The recarbonated material would then again have to be decarbonated with a correspondingly increased thermal outlay.

It is therefore the object of the invention to design a method for calcining, particularly for calcining raw cement meal into cement clinker, in such manner that material which has already been deacidified can be employed without the occurrence of a significant recarbonation of the deacidified material.

This object is inventively achieved given a method of the type initially cited in that fine-grained, burned lime (CaO) and/or lime hydrate (calcium hydroxide $Ca(OH)_2$) are employed as an additional raw meal component, whereby the additional component is added to the remaining raw meal components at such a location at which said raw meal components have already been preheated to at least approximately 350° C. by the exhaust gases of the sintering stage and/or of the calcining stage.

Given this method, in which the deacidified material is supplied to the preheating system as an additional raw meal component below the remaining raw meal components, the recarbonation of the deacidified material, which occurs according to the chemical equations

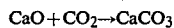

$CaO + CO_2 \rightarrow CaCO_3$

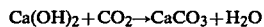

$Ca(OH)_2 + CO_2 \rightarrow CaCO_3 + H_2O$ is suppressed, because the deacidified material would already be approximately 70 through 72% recarbonated in the lower temperature range from 200 through approximately 350° C.

The additional cold, deacidified raw meal component is introduced into the preheating or calcining stage with particular advantage at such a location at which it is heated very rapidly, preferably within a few seconds, to a temperature of approximately 800° C. Given a five-stage cyclone heat exchanger system, this point of introduction of the deacidified raw meal components is the fourth or fifth cyclone stage as counted from the top toward the bottom or, respectively, the precalcining zone itself given the existence of a precalcining zone supplied with fuel.

A recarbonation of a maximum of only 10% is then caused by the further thermal treatment of the deacidified material which has been introduced. According to a special feature of the invention, the additional, cold, deacidified raw meal component is not introduced into the hot exhaust gas stream flowing from the bottom toward the top, but, rather, in every instance, is introduced into the hot stream of raw meal which is falling from the top toward the bottom in order to largely avoid contact with a $CO_2$ atmosphere.

If the calcining stage is equipped with a precalcining zone which is supplied with hot exhaust gas from the cement clinker cooler via a tertiary air conduit, a further feature of the invention offers the possibility of introducing the additional, deacidified raw meal components into the tertiary air conduit which is not enriched with $CO_2$, said deacidified component being heated above the critical temperature of approximately 350° C. in the shortest time without danger of recarbonation before it arrives in the precalcining zone of the calcining stage.

The invention and its further features and advantages are described in greater detail on the basis of the sample embodiment schematically illustrated in the drawing.

BRIEF DESCRIPTION OF THE DRAWING

The drawing shows a calcining system for the manufacture of cement clinker with a rotary tubular kiln 10 to which a raw meal preheater and a calciner are pre-connected and to which a clinker cooler (not illustrated) is post-connected. As seen from the top toward the bottom, the raw meal preheater consists of four cyclone heat exchangers or, respectively, cyclone stages 11, 12, 13, 14, whereby raw cement meal 15 which usually consists of a fine-grained mixture consisting of a limestone component and of a clay component is supplied to the uppermost cyclone stage 11. For the purpose of a high-grade calcination of the raw cement meal, fuel 18 is introduced in an ascending conduit 16 between the rotary tubular kiln 10 and the lowest cyclone stage 17 before the raw cement meal enters the rotary tubular kiln 10 as seen in the direction of flow of the raw meal, said fuel 18 being burned upon intimate mixture with the raw meal which has been preheated in the raw meal preheater, being burned in a gas atmosphere which is formed of the exhaust air from the cooler supplied via the tertiary air conduit 19 and, under certain conditions, of exhaust gas from the rotary tubular kiln and being further burned in such manner that the heat of combustion is directly transferred to the raw meal and is exploited for the desired, high-grade calcination. The highly calcined raw cement meal enters into the rotary tubular kiln 10 via the fifth or, respectively, lowest cyclone stage 17 and through the raw meal conduit 20. Overall, the raw cement meal 15 flows through the five cyclone stages from top to bottom in a combined counterflow/co-current flow with respect to the hot exhaust gases 21 leaving the rotary tubular kiln 10 and/or with respect to the hot exhaust air 22 of the clinker cooler. The exhaust gases are withdrawn by means of the induced draft blower 23.

In the inventive method, fine-grained, burned lime and/or lime hydrate (calcium hydroxide) can be employed as an additional raw meal component in addition to the raw meal 15 which generally consists of a limestone component and of a clay component without a recarbonation arising with respect to said additional raw meal component which is already deacidified and which would result in an increased thermal outlay for the repeated decarbonation of said component. The additional raw meal component can, for example, consist of 50% lime hydrate and of 50% deacidified dusts from the various dedusting devices of different calcining systems. The additional raw meal component is ground in a special mill separately from the remaining raw meal components and is introduced via a metering conveyor-type weigher into the hot meal conduit 25 at 24 which discharges into the fourth cyclone stage 14 or is introduced at 26 into the hot meal conduit 27 discharging into the precalcining zone 16 or is introduced at 28 into the hot meal connection line 20 between the fifth cyclone stage 17 and the rotary tubular kiln intake chamber. Given the introduction of the additional raw meal components 24, 26, 28 which have already been largely deacidified into a respective hot meal conduit, a direct contact with rotary kiln exhaust gas, which is enriched with $CO_2$ to approximately 30%, is largely avoided, as is likewise an undesired recarbonation. The additional raw meal component can also be introduced into the calcining system at the various locations simultaneously and subdivided. The mixing or, respectively, homogenization of the raw cement meal 15 introduced at the top with the deacidified raw meal component introduced into the calcining system further below primarily ensues in the cyclone stage 14, in the precalcining zone 16, and/or in the cyclone stage 17 and in the rotary kiln 10. In any case, the additional, cold raw meal component 24, 26, 28 which has already been largely deacidified is introduced into the preheating or calcining stage of the calcining system at such a location at which it is heated to a temperature of, particularly, approximately 800° C. very quickly, preferably within a few seconds, because a significant recarbonation due to the further thermal treatment of the additional raw meal component with the exhaust gases containing $CO_2$ and water vapor no longer occurs given this rapid heating to this high temperature.

According to a special feature of the invention, the additional raw meal component which has been largely deacidified can be introduced at 29 into the tertiary air conduit 19 coming from the cement clinker cooler, in which conduit 19 the raw meal component can be heated above the critical temperature in the shortest possible time without danger of recarbonation before it arrives in the precalcining zone 16.

I claim:

1. In a method for burning fine-grained material, particularly for the manufacture of cement clinker from cement raw meal containing a limestone component and a clay component in which a stream of said cement raw meal is sequentially treated in a preheating stage, a pre-calcining stage, a calcining stage and a sintering stage at progressively increasing temperatures, and thereafter in a cooling stage, the improvement which comprises:
introducing a deacidified raw meal fraction into a stream of air from said cooling stage at a temperature of at least about 350° C. to heat the fraction to a decarbonation temperature and then passing the fraction into said pre-calcining stage.

2. A method according to claim 1 in which:
said deacidified raw meal fraction consists of burned lime, hydrated lime, or both.

3. A method according to claim 1 which includes the step of:
introducing said deacidified raw meal fraction into said stream at a location at which it is heated rapidly to a temperature of approximately 800° C.

4. A method according to claim 1 in which:
said stream of raw meal descends by gravity between said stages, and some deacidified raw meal is introduced into the downwardly descending stream.

5. A method according to claim 1 in which:
said deacidified raw meal is a deacidified dust.

6. A method according to claim 1 in which:
said preheating stage consists of a plurality of cyclone separators in series, and
a deacidified raw meal fraction is introduced into the last or next to the last cyclone separator in the series.

7. A method according to claim 1 which includes the step of:
introducing a deacidified raw meal fraction directly into the inlet of said calcining stage.

* * * * *